United States Patent [19]
Peyatt

[11] Patent Number: 5,267,410
[45] Date of Patent: Dec. 7, 1993

[54] FISH BUCKET

[76] Inventor: Clayton J. Peyatt, 4104 Smith Ave., Cleveland, Ohio 44109

[21] Appl. No.: 23,633

[22] Filed: Feb. 26, 1993

[51] Int. Cl.⁵ .................................................. A01K 97/04
[52] U.S. Cl. ........................................................... 43/57
[58] Field of Search ................... 43/56, 57; 261/121.2

[56] References Cited

U.S. PATENT DOCUMENTS

| | | | |
|---|---|---|---|
| 913,379 | 2/1909 | Hart | 43/57 |
| 1,604,971 | 11/1926 | Churchill | 261/121.2 |
| 2,736,983 | 3/1956 | Hostetter | 43/57 |
| 2,767,509 | 10/1956 | Breithaupt | 43/57 |
| 2,767,510 | 10/1956 | Hopkins | 43/57 |
| 3,323,249 | 6/1967 | Randall | 261/121.2 |
| 3,509,657 | 5/1970 | Bross | 43/57 |
| 4,261,131 | 4/1981 | Poffenberger | 43/57 |
| 4,462,180 | 7/1984 | Scott | 43/57 |
| 4,677,785 | 7/1987 | Lambourn | 43/57 |
| 5,193,301 | 3/1993 | Figgins | 43/57 |

Primary Examiner—Kurt Rowan
Attorney, Agent, or Firm—S. Michael Bender

[57] ABSTRACT

A fish bucket, for keeping fish alive once they are caught, is disclosed. The bucket includes an inner and outer cylinder having insulation between them. It also includes an air pump and a manifold for circulating air through water placed in the inner cylinder. The bucket further includes a pair of tubes which supply the water with the substances to create a proper environment for fish.

9 Claims, 4 Drawing Sheets

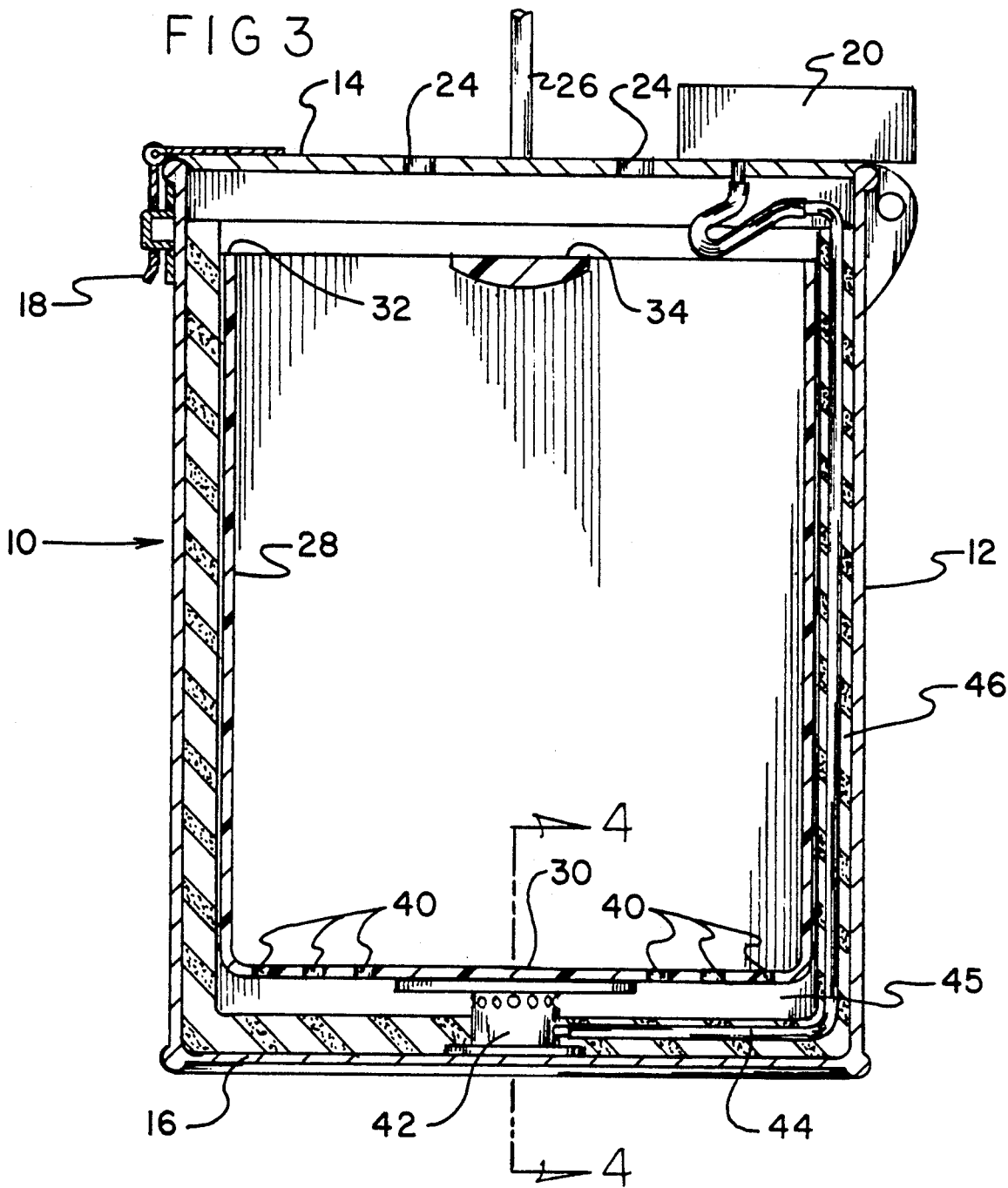

FISH BUCKET

BACKGROUND OF THE INVENTION

1. Field of the Invention

The present invention relates generally to fishing devices, and more particularly, to a device for keeping fish alive once caught.

2. Description of the Prior Art

Devices for keeping fish alive outside their home environment generally are well known. For example, U.S. Pat. No. 3,710,502, dated Jan. 16, 1973, discloses a bucket for keeping bait alive having a valve to allow oxygen to be introduced into the water. Similarly, U.S. Pat. No. 4,757,636, dated Jul. 19, 1988, discloses an insulated bucket for keeping bait alive. Likewise, U.S. Pat. No. 4,677,785, dated Jul. 7, 1987, discloses an aerated live bait bucket having an air pump activated by a switch at the base of the bucket. Furthermore, U.S. Pat. No. 4,166,086, discloses a live bait bucket having an impeller within the bucket to stir and aerate the water. Finally, U.S. Pat. No. 4,896,451, dated Jan. 30, 1990, discloses an electric device for fishing from a ship. A need exists, though, for a device for keeping fish, which are caught on a long fishing trip, alive so they do not spoil before they can be eaten. Many times when people go on a long fishing trip, they catch many fish. These fish are normally eaten. If more fish are caught than can be eaten, these fish eventually spoil if they are not kept alive. Thus, a need exist for keeping fish alive until it is time to eat them and thus avoid waste. This also allows fishermen to prepare in case many fish are caught early in the trip and none later. Thus, the fishermen will have food for later in their trip and will neither go hungry nor have to cut their trip short.

SUMMARY OF THE INVENTION

To achieve the foregoing and other advantages, the present invention, briefly described, provides a fish bucket, for keeping fish alive once they are caught. The bucket includes an inner and outer cylinder having insulation between them. It also includes an air pump and a manifold for circulating air through water placed in the inner cylinder. The bucket further includes a pair of tubes which supply the water with the substances to create a proper environment for fish.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved fish bucket which has all of the advantages of the prior art and none of the disadvantages.

It is another object of the present invention to provide a new an improved fish bucket which may be easily and efficiently manufactured and marketed.

It is a further objective of the present invention to provide a new and improved fish bucket which is of durable and reliable construction.

An even further object of the present invention is to provide a new and improved fish bucket which is susceptible of a low cost of manufacture with regard to both materials and labor, and which accordingly is then susceptible of low prices of sale to the consuming public, thereby making such fish bucket available to the buying public.

Still yet a further object of the present invention is to provide a new and improved fish bucket for keeping fish caught on a fishing trip in an environment they are used to.

It is still a further object of the present invention to provide a new and improved fish bucket which keeps fish caught on a fishing trip alive for as long as necessary.

Still a further object of the present invention is to provide a new and improved fish bucket for removing the possibility of fish, caught on a fishing trip, spoiling before they can be eaten.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is a view of the fish bucket of the present invention taken along the line 3—3 of FIG. 2.

FIG. 4 is a view of the fish bucket of the present invention taken along the line 4—4 of FIG. 3.

DESCRIPTION OF THE PREFERRED EMBODIMENT

With reference now to the drawings, a new and improved fish bucket embodying the principles and concepts of the present invention will be described.

Figure 1:
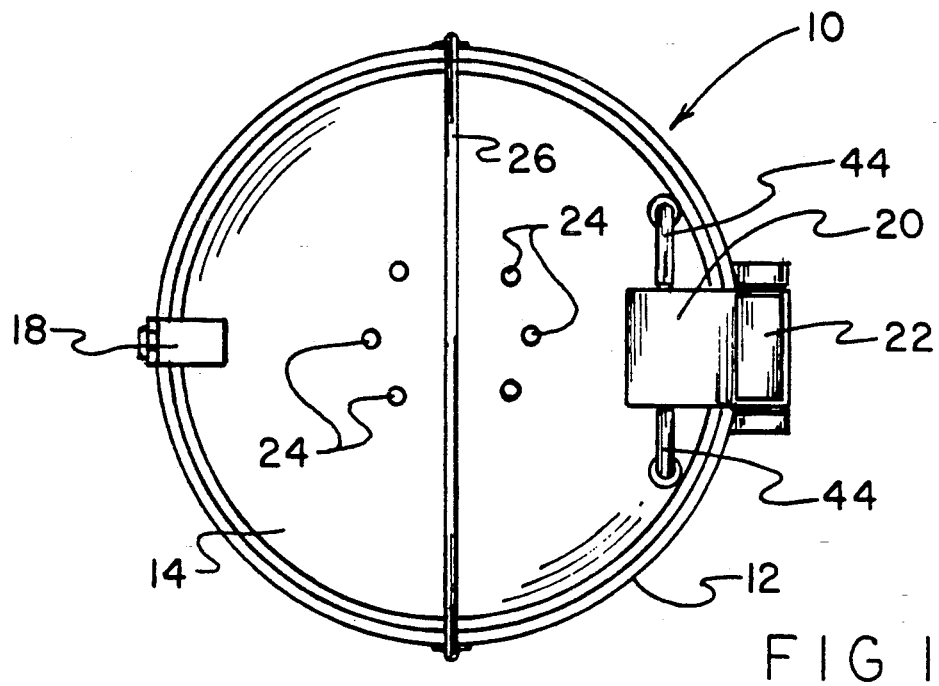
FIG. 1 is a top view of the fish bucket of the present invention.
Figure 2:
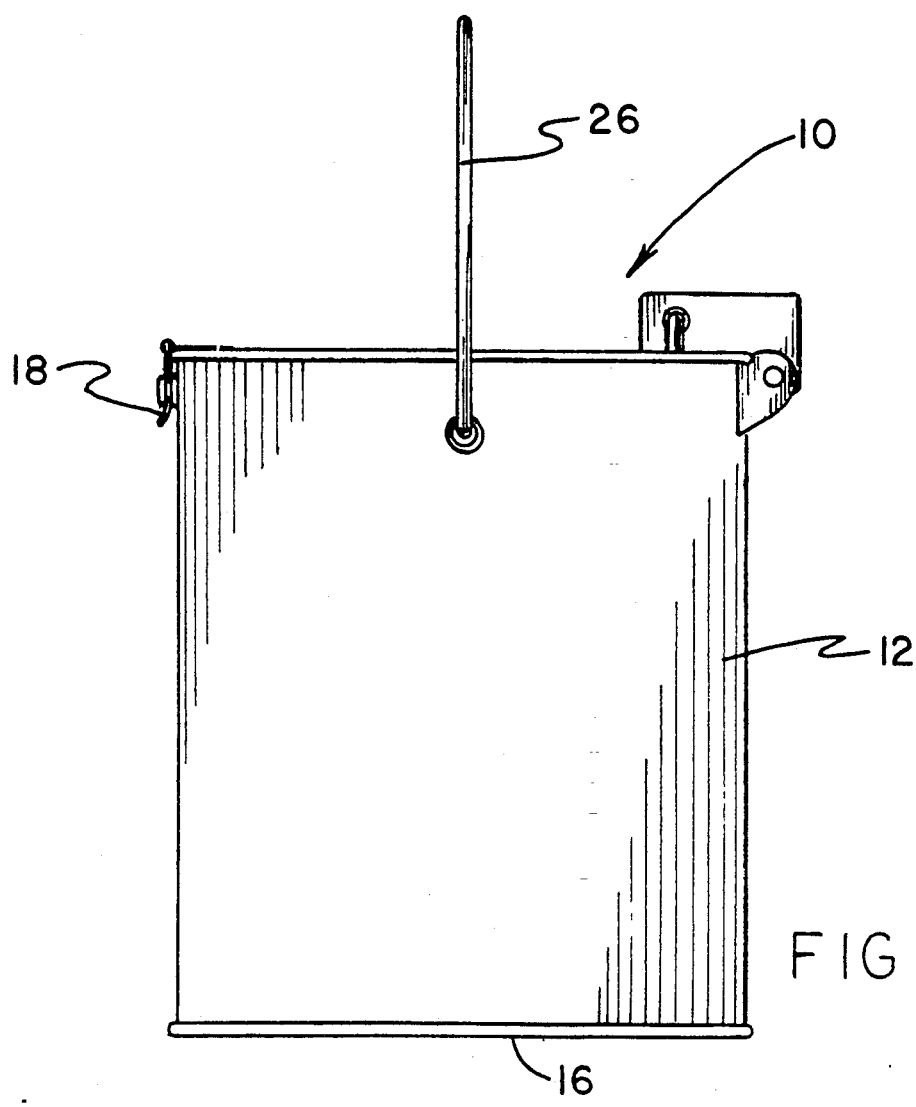
FIG. 2 is a side view of the fish bucket of the present invention.
Figure 5:
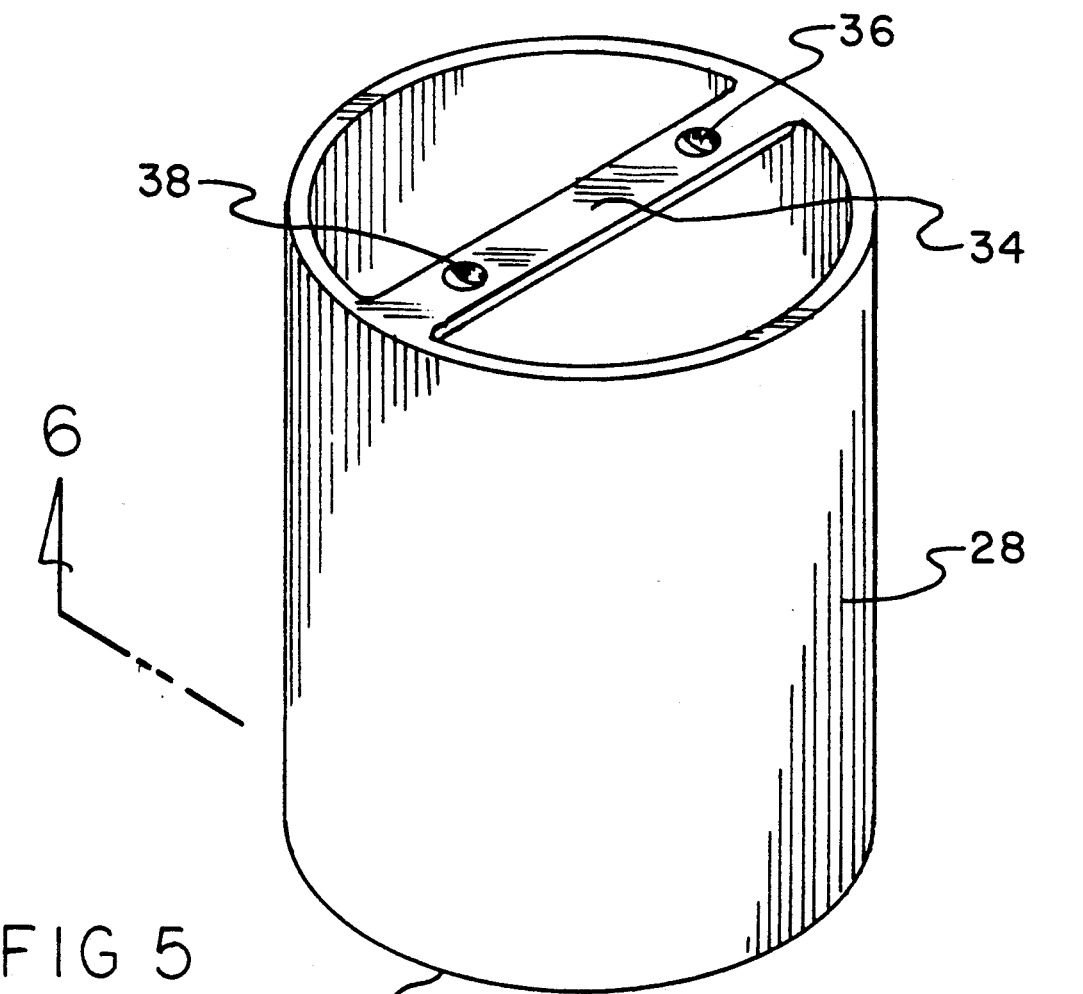
FIG. 5 is a perspective view of the inner cylinder of the fish bucket of the present invention.
Figure 6:
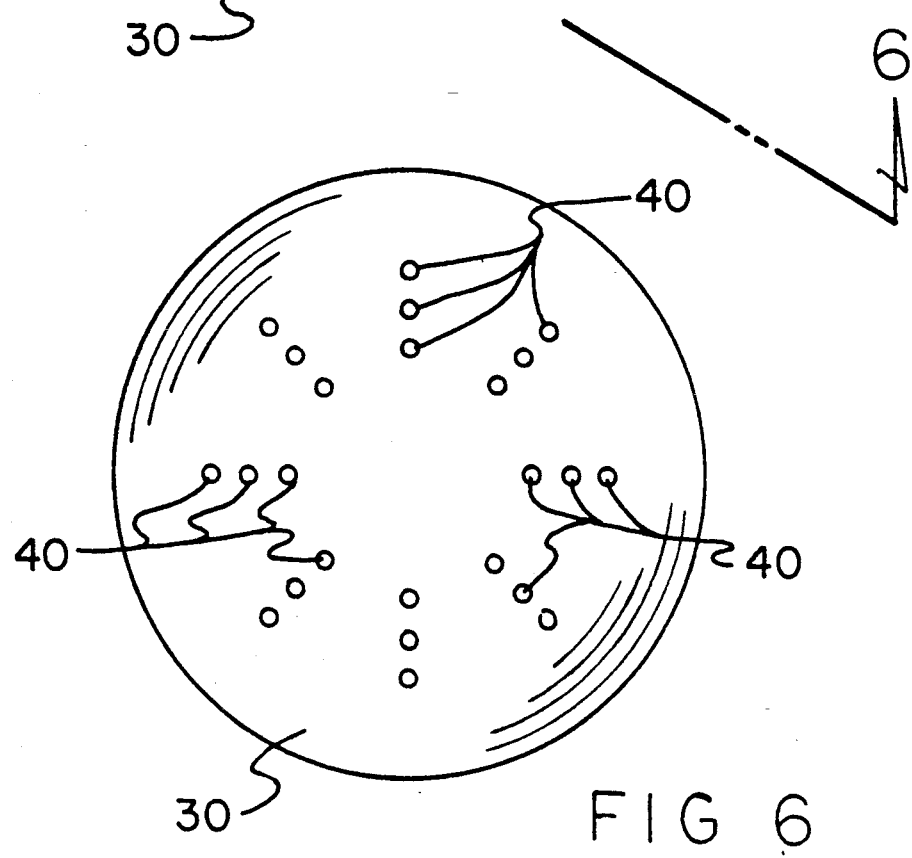
FIG. 6 is a view of the fish bucket of the present invention taken along the line 6—6 of FIG. 5.
Figures 7, 8:
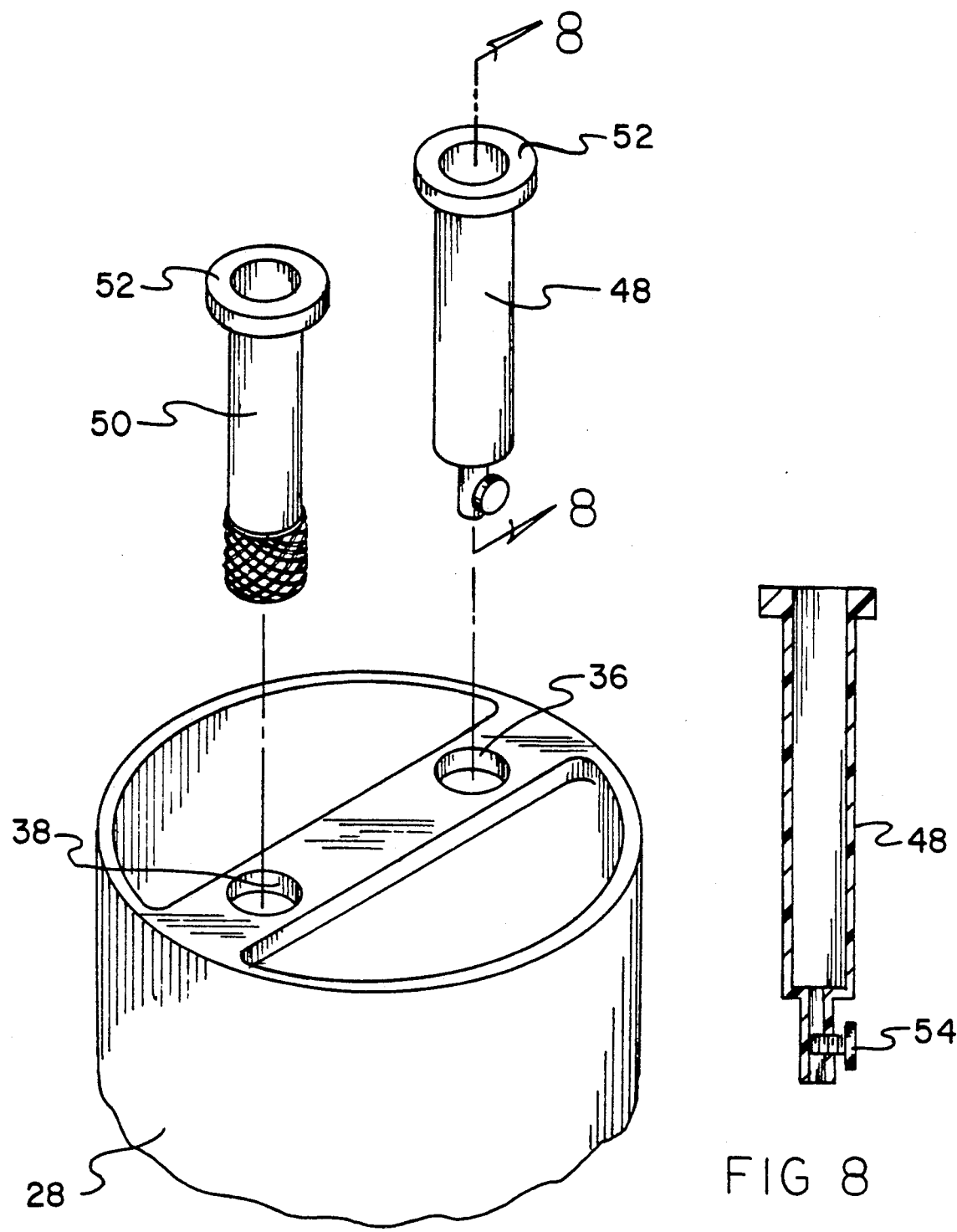
FIG. 7 is a top view of the inner cylinder of FIG. 5.
FIG. 8 is a perspective view of the tube of FIG. 7.

Turning to FIGS. 1-8, there is shown an exemplary embodiment of the fish bucket designated by reference numeral 10. In its preferred form, the fish bucket comprises generally a cylindrical shaped housing or container having a cylindrical outer wall 12, a top wall 14 and a bottom wall 16. The top wall 14 is able to be opened and closed. When closed, the top wall 14 is secured by a latch 18. The cylindrical housing is hollow inside. Secured to the top wall 14 of the housing 10 is an air pump 20 which is driven by a battery 22. The top wall 14 also has air holes 24 placed around its center. Suitably attached to the cylindrical outer wall 12 is a pivotable handle 26 for facilitating carrying or transporting of the bucket by hand.

Within the cylindrical housing is a cylindrical tube 28 or other container which has a closed bottom side 30 and an open top side 32. The top side 32 has a bar 34 across its diameter. The bar 34 has two holes 36 and 38 placed at equal distances from the edge of the top side. The bottom side 30 has holes 40 all around its surface. The cylindrical tube 28 fits concentrically within the cylindrical housing 10.

Beneath the cylindrical tube 28 and within the housing 10 is a manifold 42. Attached to the manifold 42 is a tube 44. The tube 44 connects the air pump 20 to the manifold 42.

Between the housing 10 and the inner cylindrical tube 28 is insulation 46. The insulation keeps the inner cylindrical tube 28 at a constant temperature.

The inner cylindrical tube 28 is filled with water. Cylindrical tubes 48 and 50 are placed through the holes 36 and 38 respectively. The tubes each have a lip 52 around their upper ends to hold them atop the bar 34 of the upper side 32 of the inner cylindrical housing 28. The cylindrical tubes 48 and 50 rest their lower ends in the water filling the inner cylindrical housing 28. One of the cylindrical tubes 50 is for holding rock salt. The other cylindrical housing 48 holds another substance to be placed in the water, such as fish food. The amount of substance to be introduced to the water is regulated by a screw plug 54 at the lower end of the cylindrical tube 48.

In operation, the inner cylindrical tube is filled with water. The rock salt tube and other tube are inserted into the water to create the proper atmosphere for holding fish. The air pump is then turned on and air is pumped down through tubes 44 and into the manifold 42. The manifold circulates air beneath the inner cylindrical tube, distributing the air to the holes 40 within the bottom side of the inner cylindrical tube. The air is pumped into the inner cylindrical tube, thus circulating the water within the tube. Air enters the manifold from tubes 44 through holes 43 provided circumferentially in the sidewall of the manifold substantially as shown and exits into the water filled space 45 under tube 28. The air hen travels upwardly through holes 40 to aerate and circulate the water in the inner tube or container 28.

A proper environment is thus created for a fish to live in after being caught. The object of this bucket is to keep fish alive for a longer time when caught on a fishing trip. This avoids the possibility of the fish spoiling once dead.

Alternatively, the bucket according to the invention may be used as a portable fish well for keeping fish to be used as bait alive and vigorous for extended periods of time. In fact, the bucket may be used to keep the bait alive until the fish are caught and then used to keep the fish alive until they are brought home.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved fish bucket for keeping fish caught on a fishing trip alive, comprising:
    an outer container having:
    a solid bottom;
    a flip top; and
    a handle;
    a manifold on the inside of the bottom of the outer container;
    an inner container, placed atop the manifold, having:
        a solid bottom having holes spaced throughout; and
        a top bar extending across the top of said inner container;
    an air pump attached to the top of said outer outer container;
    a battery for driving the air pump; and
    an air tube connecting the air pump to the manifold for supplying air to the manifold for distribution to the inside of the inner container.

2. The invention claimed in claim 1 further comprising insulation placed between the inner and outer containers.

3. The invention as claimed in claim 2 further comprising a latch placed on an upper edge of the outer container for sealing the flip top closed.

4. The invention as claimed in claim 3 wherein the flip top of the outer container has a series of holes throughout.

5. The invention as claimed in claim 4 wherein water is placed inside the inner container.

6. The invention as claimed in claim 5 wherein the top bar of the inner container has first and second holes along its length.

7. The invention as claimed in claim 6 further comprising a rock salt tube placed in the first hole of the top bar for creating salt water.

8. The invention as claimed in claim 7 further comprising a feeding tube placed in the second hole of the top bar for feeding fish placed in the water.

9. The invention as claimed in claim 8 wherein the feeding tube has a cork screw placed in a bottom side thereof for regulating the amount of food delivere to the water.

* * * * *